United States Patent
Alting et al.

(10) Patent No.: US 10,479,059 B2
(45) Date of Patent: Nov. 19, 2019

(54) MULTIPLE LAYER FILM AND COMPOSITE MATERIAL PRODUCED THEREFROM

(75) Inventors: Kirsten Alting, Muenster (DE); Roland Wursche, Duelmen (DE); Harald Haeger, Luedinghausen (DE); Martin Wielpuetz, Senden (DE)

(73) Assignee: Evonik Degussa GmbH, Essen (DE)

( * ) Notice: Subject to any disclaimer, the term of this patent is extended or adjusted under 35 U.S.C. 154(b) by 1630 days.

(21) Appl. No.: 12/302,298

(22) PCT Filed: Jan. 15, 2008

(86) PCT No.: PCT/EP2008/050371
§ 371 (c)(1),
(2), (4) Date: Nov. 25, 2008

(87) PCT Pub. No.: WO2008/087128
PCT Pub. Date: Jul. 24, 2008

(65) Prior Publication Data
US 2009/0286096 A1    Nov. 19, 2009

(30) Foreign Application Priority Data
Jan. 17, 2007  (DE) ................ 10 2007 003 327

(51) Int. Cl.
B32B 27/34  (2006.01)
C08G 73/10  (2006.01)
B32B 27/30  (2006.01)
C08L 33/06  (2006.01)

(52) U.S. Cl.
CPC .............. B32B 27/34 (2013.01); C08G 73/10 (2013.01); *B32B 27/30* (2013.01); *B32B 2250/03* (2013.01); *B32B 2605/00* (2013.01); *C08L 33/062* (2013.01); *C08L 33/068* (2013.01); *Y10T 428/31728* (2015.04)

(58) Field of Classification Search
CPC ....... B32B 27/34; B32B 27/30–27/308; B32B 2605/00; B32B 2250/03; C08G 73/0206; C08G 73/10; C08L 2205/03; C08L 33/04–33/16; C08L 77/00–77/10; C08L 33/062; C08L 33/068; Y10T 428/31728
See application file for complete search history.

(56) References Cited

U.S. PATENT DOCUMENTS

| | | | |
|---|---|---|---|
| 5,468,530 A * | 11/1995 | Gotz et al. ................. | 428/36.4 |
| 6,335,101 B1 | 1/2002 | Haeger et al. | |
| 6,355,358 B1 | 3/2002 | Boeer et al. | |
| 6,670,004 B1 | 12/2003 | Green et al. | |
| 6,794,048 B2 | 9/2004 | Schmitz et al. | |
| 2001/0051256 A1 | 12/2001 | Silagy et al. | |
| 2002/0142118 A1 | 10/2002 | Schmitz et al. | |
| 2006/0014035 A1 | 1/2006 | Montanari et al. | |
| 2006/0083882 A1 | 4/2006 | Schmitz et al. | |
| 2006/0281873 A1 | 12/2006 | Alting et al. | |
| 2006/0292387 A1 | 12/2006 | Kuhmann et al. | |
| 2007/0104971 A1 | 5/2007 | Wursche et al. | |
| 2007/0166560 A1 | 7/2007 | Wursche et al. | |
| 2008/0119632 A1 | 5/2008 | Baumann et al. | |
| 2008/0166529 A1 | 7/2008 | Hager et al. | |
| 2008/0213552 A1 | 9/2008 | Hager et al. | |
| 2008/0261010 A1 | 10/2008 | Wursche et al. | |
| 2008/0317986 A1 | 12/2008 | Schmitz et al. | |
| 2009/0044906 A1 | 2/2009 | Goring et al. | |
| 2010/0221551 A1 | 9/2010 | Wursche et al. | |
| 2012/0094116 A1 | 4/2012 | Wursche et al. | |

FOREIGN PATENT DOCUMENTS

| | | |
|---|---|---|
| KR | 10-0382091 B1 | 5/2003 |
| WO | WO 0194110 A1 * | 12/2001 |
| WO | 2005 123384 | 12/2005 |
| WO | 2006 066944 | 6/2006 |

OTHER PUBLICATIONS

Estes, L. L. and Schweizer, M. 2011. Fibers, 4. Polyamide Fibers. Ullmann's Encyclopedia of Industrial Chemistry.*
Troughton, Michael J. (2008). Handbook of Plastics Joining—A Practical Guide (2nd Edition). William Andrew Publishing. p. 533.*
U.S. Appl. No. 12/515,543, filed May 20, 2009, Wursche, et al.
U.S. Appl. No. 10/024,386, filed Dec. 21, 2001, US2002/0142118 A1, Schmitz, et al.
U.S. Appl. No. 10/589,264, filed Aug. 14, 2006, US2007/0166560 A1, Wursche, et al.
U.S. Appl. No. 11/240,493, filed Oct. 3, 2005, US2006/0083882 A1, Schmitz, et al.
U.S. Appl. No. 10/588,487, filed Aug. 4, 2006, US2008/0317986 A1, Schmitz, et al.
U.S. Appl. No. 11/813,103, filed Oct. 16, 2007, US2008/0119632 A1, Baumann, et al.
U.S. Appl. No. 11/816,595, filed Mar. 25, 2008, US2008/0166529 A1, Hager, et al.
U.S. Appl. No. 11/816,588, filed Aug. 17, 2007, US2008/0213552 A1, Hager, et al.
U.S. Appl. No. 11/816,556, filed Jan. 28, 2008, US2008/0261010 A1, Wursche, et al.
U.S. Appl. No. 11/448,913, filed Jun. 8, 2006, US2006/0281873 A1, Alting, et al.

(Continued)

Primary Examiner — John D Freeman
(74) Attorney, Agent, or Firm — Oblon, McClelland, Maier & Neustadt, L.L.P.

(57) ABSTRACT

A film comprising the following layers:
I. a layer based on a polyamide whose monomer units contain an average of at least 8 carbon atoms,
II. an immediately adjacent layer composed of a moulding composition comprising a polyamide as in I. and a copolymer having functional groups
is used for the production of a composite with a substrate which comprises PA6, PA66, PA6/66 or PPA, giving secure adhesion.

19 Claims, No Drawings

(56) References Cited

OTHER PUBLICATIONS

U.S. Appl. No. 11/586,526, filed Oct. 26, 2006, US2007/0104971 A1, Wursche, et al.
U.S. Appl. No. 12/438,142, filed Feb. 20, 2009, Luetzeler, et al.
U.S. Appl. No. 12/438,364, filed Feb. 23, 2009, Luetzeler, et al.
U.S. Appl. No. 12/373,547, filed Jan. 13, 2009, Luetzeler, et al.
U.S. Appl. No. 12/192,208, filed Aug. 15, 2008, US2009/0044906 A1, Goring, et al.
U.S. Appl. No. 12/780,595, filed May 14, 2010, US2010/0221551 A1, Wursche, et al.
U.S. Appl. No. 11/341,520, filed Jan 30, 2006, US2006/0292387 A1, Kuhmann, et al.
U.S. Appl. No. 12/989,899, filed Oct. 27, 2010, Wursche, et al.
U.S. Appl. No. 13/150,683, filed Jun. 1, 2011, Alting, et al.
U.S. Appl. No. 13/322,470, filed Dec. 21, 2011, US2012/0094116 A1, Wursche, et al.
U.S. Appl. No. 13/649,498, filed Oct. 11, 2012, Pawlik, et al.
U.S. Appl. No. 13/649,319, filed Oct. 11, 2012, Pawlik, et al.

* cited by examiner

MULTIPLE LAYER FILM AND COMPOSITE MATERIAL PRODUCED THEREFROM

This application is a National Stage of PCT/EP2008/050371, which was filed on Jan. 15, 2008. This application is based upon and claims the benefit of priority to German Application No 10 2007 003 327.5, which was filed on Jan. 17, 2007.

The present invention relates to a film which comprises an outer layer composed of a polyamide, and also comprises an adhesion promoter, which permits coupling to a moulding composition which is used for reverse coating by an injection-moulding method and is based on PA6, and the like. The invention also relates to the use of this film for the production of a composite part, for example by means of reverse coating by an injection-moulding method, and also relates to the resultant composite part.

Moulding compositions from the class of the polyamides have advantageous properties for the production of a very wide variety of consumer articles. In particular, the combination of these properties with the feature of transparency is of interest, and provides a pathway to the production of transparent films, which can be used for the finishing or decoration of surfaces. Materials that can be used here are especially polyamides having relatively long-chain aliphatic monomer components, since this method gives particularly good impact resistance, even at low temperatures, good chemicals resistance, and sufficient scratch resistance and sufficient gloss. Examples are PA12, PA11, PA1010, PA1012 or their blends. The bond between substrate and film for decoration here can be achieved by a number of manufacturing processes. By way of example, the film can be pressed with the substrate, or the process of reverse coating by an injection-moulding method may be selected, in which the film is placed in the injection mould during production of the component. The idea of a film as carrier of a decorative effect follows a trend towards individualization of design elements on automobiles. This trend specifically leads to a wider range of models in the manufacturing process, but with a reduction in the number of components respectively manufactured per product range. The use of films can meet this challenge, because it permits rapid, problem-free design change. An important factor here is that the film complies with the standards required in the automobile industry for surface properties (Class A surface), resistance to fluids, and appearance. Films of this type can also be used with good effect in the design of interior surfaces in automobiles.

Decorative films of this type are known in principle. EP 0 949 120 A1 describes by way of example decorative films with a transparent outer layer composed of polyurethane, polyacrylate, or fluoropolymer, or a mixture composed of fluoropolymer and polyacrylate. WO 94/03337 and EP 0 285 071 A2 also disclose similar decorative films.

The property profile of polyamides, in particular of polyamides based on PA12 or PA11, for example their impact resistance and chemicals resistance, very generally gives them good suitability for the production of decorative films of this type. Accordingly, the patent literature has descriptions of decorative or protective films comprising an outer layer composed of a polyamide. The specifications JP60155239A, JP2003118055A, EP 1 302 309 A, EP 0 522 240 A, EP 0 694 377 A, EP 0 734 833 A, WO 9212008 A and EP 0 568 988 A may be mentioned here by way of example.

A substrate which is suitable on the basis of the properties of the material, and also inexpensive, is provided by moulding compositions based on PA6, PA66, and copolymers thereof, termed PA6/66, and also by semiaromatic polyamides in which, starting from PA6, PA66 or PA6/66, a portion of the monomer units has been replaced by units which derive, for example, from the combination of terephthalic acid and hexamethylene-diamine. Semiaromatic polyamides of this type are often termed PPA.

EP-A-1 731 569 discloses composite parts composed of a multilayer film whose outer layer is composed of a polyamide moulding composition, and of a substrate composed of a polyamide-based moulding composition. However, there is no disclosure there of PA6 and the like as substrate, or of an adhesion promoter optimized with respect to adhesion.

Composite parts which comprise a polyamide outer layer, a substrate composed of an ABS moulding composition, and an adhesion promoter optimized therefor are disclosed in WO 2005/123384. The adhesion promoter described there bonds to the polyamide outer layer primarily via reaction of the anhydride groups present with the amino end groups of the polyamide, whereas it couples to the ABS substrate solely on the basis of molecular compatibility, i.e. purely physically. If a polyamide which contains only a low concentration of amino end groups is used as outer layer material, adhesion becomes poorer. However, it is disadvantageous if a polyamide which contains a relatively high concentration of amino end groups is used as outer layer material, since amino end groups lead to a poorer colour curve on exposure to heat-ageing or generally on exposure to oxidative degradation; the result is progressive yellowing during processing and also during service life, especially at relatively high temperatures, for example in the engine compartment, and this is undesirable.

The object of the present invention consisted in providing an adhesion promoter which is intended for bonding between a layer composed of a higher polyamide and a substrate applied in a second operation and based on PA6, PA66, PA612 or PPA, and which gives very good adhesion to the polyamide layer even when this contains hardly any amino end groups. One aspect of the object consisted in provision of composite parts with secure layer adhesion composed of this type of film and of a substrate applied in a separate operation and based on the abovementioned polyamides.

These objects, and further objects discernible from the application, have been achieved via the use of a film which comprises the following layers:

I. an upper layer composed of a moulding composition which comprises at least 60% by weight, preferably at least 70% by weight, particularly preferably at least 80% by weight and with particular preference at least 90% by weight, of polyamide, the monomer units of which contain an average of at least 8 carbon atoms, and preferably at least 9 carbon atoms, and also II. an immediately adjacent layer composed of a moulding composition which comprises the following components:
  a) from 50 to 99 parts by weight, preferably from 60 to 98 parts by weight, particularly preferably from 70 to 96 parts by weight, with particular preference from 75 to 95 parts by weight and very particularly preferably from 80 to 94 parts by weight, of a polyamide composition composed of
    α) from 40 to 100% by weight, preferably from 50 to 99.9% by weight and particularly preferably from 60 to 99% by weight, of polyamide, the monomer units of which contain an average of at least 8 carbon atoms, preferably at least 9 carbon atoms, and β) from 0 to 60% by weight, preferably from 0.1 to 50% by weight and particularly preferably from 1 to 40% by weight, of polyamide selected from the group of PA6, PA66, PA6/66, and copolyamides, termed PPA hereinafter, in which, starting from these, at most 50%, preferably at most 30% and particularly preferably at most 25%, of all of the monomer units have been replaced by aromatic monomer units, or else a mixture of these, where the percentages are based on the entirety of α) and β), b) from 1 to 50 parts by weight, preferably from 2 to 40 parts by weight, particularly preferably from 4 to 30 parts by weight, with particular preference from 5 to 25 parts by weight and very particularly preferably from 6 to 20 parts by weight, of a copolymer which contains the following monomer units:

from 70 to 99.9% by weight of monomer units which derive from vinyl compounds selected from acrylic acid derivatives, methacrylic acid derivatives, α-olefins and vinyl-aromatics, and also from 0.1 to 30% by weight of monomer units which contain a functional group selected from a carboxylic anhydride group, an epoxy group, and an oxazoline group, where the total of the parts by weight of II.a) and II.b) is 100, for the production of a composite with a substrate composed of a moulding composition which comprises at least 40% by weight, preferably at least 50% by weight and particularly preferably at least 60% by weight, of polyamide selected from the group of PA6, PA66, PA6/66, and mixtures of these.

The monomer units of the polyamide of the layer according to I., which derive from diamine, dicarboxylic acid or lactam (or aminocarboxylic acid) have an average of at least 8 carbon atoms and preferably at least 9 carbon atoms. For the purposes of the invention, examples of suitable polyamides are:

the polyamide composed of 1,12-dodecanedioic acid and 4,4'-diaminodicyclohexylmethane (PA PACM12), in particular starting from a 4,4'-diaminodicyclohexylmethane whose trans, transisomer content is from 35 to 65%;

PA88, PA610, PA612, PA1010, PA1012, PA11, PA12, PA1212, and also mixtures thereof;

copolyamides which derive from PA88, PA610, PA612, PA1010, PA1012, PA11, PA12 or PA1212, with at most 40 mol %, preferably at most 30 mol %, particularly preferably at most 20 mol % and with particular preference at most 15 mol %, of other polyamide-forming monomers;

polyamides composed of m- and/or p-xylylenediamine and of a dicarboxylic acid having from 6 to 22 carbon atoms and preferably from 10 to 18 carbon atoms, and also copolyamides thereof having at most 20 mol % and with particular preference at most 15 mol % of other polyamide-forming monomers, and also a polyetheramide or polyetheresteramide based on one of these polyamides, and also on a polyether having an average of more than 2.3 carbon atoms per oxygen atom and having a number-average molecular weight of from 200 to 5000; the content of polyamide blocks here is from 5 to 98% by weight, preferably from 15 to 90% by weight, particularly preferably from 25 to 80% by weight and with particular preference from 35 to 70% by weight.

The layer according to I. can also comprise a mixture of polyamides of this type; preference is given to mixtures composed of a homo- or copolyamide and of a polyetheramide or polyetheresteramide; a flexible layer material is obtained here, a consequence of this being that in many instances there is no need for thermoforming of the film as separate step, e.g. prior to reverse coating by an injection-moulding method, since reverse coating by an injection-moulding method also simultaneously subjects the film to a forming process.

The moulding composition of the layer according to I. can moreover comprise, as further constituents, other polymers, e.g. isorefractive rubbers which do not impair transparency, or else nanoparticles whose diameter is smaller than about ¼ of the wavelength of light, pigments, dyes, metal flakes, plasticizers, processing aids, nucleating agents and stabilizers.

In the case of the layer according to II., the polyamide of component a)α) can by way of example be selected from those mentioned above for the layer according to I. The same polyamide can be selected here respectively for the layers according to I. and II.; however, it is also possible to use different polyamides. If the person skilled in the art has any doubts as to whether two different polyamides have adequate compatibility with one another, he can easily check this by a coextrusion test, for example by coextrusion of strips.

In the case of the polyamide of component a)β), PA6/66 is a copolyamide composed of caprolactam, hexamethylenediamine and adipic acid. The quantitative ratio of caprolactam on the one hand and hexamethylenediamine/adipic acid on the other hand is not critical for the purposes of the invention. The PPA used preferably comprises copolyamides which derive firstly from caprolactam and/or hexamethylenediamine/adipic acid, and secondly from hexamethylenediamine/terephthalic acid and/or hexamethylenediamine/isophthalic acid. In extreme cases, starting from hexamethylenediamine/adipic acid, it is possible that 50% of the monomer units, i.e. of the entire amount of adipic acid, have been replaced by, for example, terephthalic acid and/or isophthalic acid.

The copolymer of component b) preferably contains the following monomer units:

1. from about 70 to about 99.9% by weight, preferably from 80 to 99.4% by weight, and particularly preferably from 85 to 99% by weight, of monomer units selected from units of the following formulae:

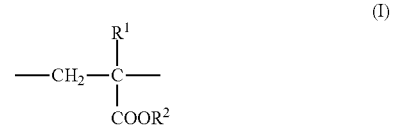

(I)

where $R^1$=H or $CH_3$ and $R^2$=H, methyl, ethyl, propyl or butyl;

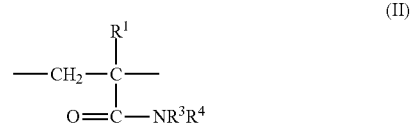

(II)

where $R^1$ is as above and $R^3$ and $R^4$, independently of one another, are identically H, methyl or ethyl;

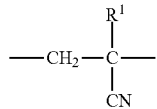 (III)

where $R^1$ is as above;

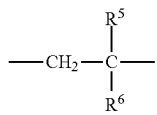 (IV)

where $R^5$=H or $CH_3$ and $R^6$=H or $C_6C_5$;

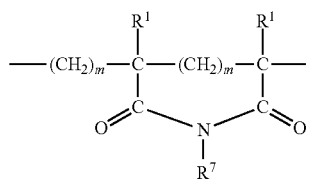 (V)

where $R^1$ is as above and $R^7$=H, methyl, ethyl, propyl, butyl or phenyl, and m=0 or 1;

2. from about 0.1 to about 30% by weight, preferably from 0.6 to 20% by weight, and particularly preferably from 1 to 15% by weight, of monomer units selected from units of the following formulae:

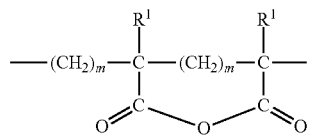 (VI)

where $R^1$ and m are as above;

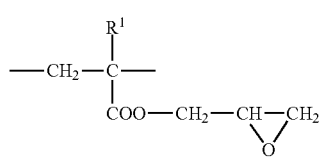 (VII)

where $R^1$ is as above;

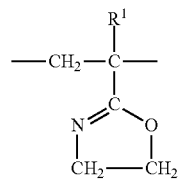 (VIII)

where $R^1$ is as above.

The units of the formula (I) derive by way of example from acrylic acid, methacrylic acid, methyl acrylate, ethyl acrylate, n-butyl acrylate, methyl methacrylate, n-propyl methacrylate, or isobutyl methacrylate.

The units of the formula (II) derive by way of example from acrylamide, methacrylamide, N-methylacrylamide, N-methylmethacrylamide, or N,N-dimethylacrylamide.

The units of the formula (III) derive from acrylonitrile or methacrylonitrile.

The units of the formula (IV) derive from ethene, propene, styrene or α-methylstyrene; these can be replaced entirely or to some extent by other polymerizable aromatics, such as p-methylstyrene or indene, which have the same effect.

If m=0, the units of the formula (V) derive from unsubstituted or substituted maleimides, such as maleimide, N-methylmaleimide, N-ethylmaleimide, N-phenylmaleimide, or N-methylaconitimide. If m=1, they derive via reaction with ammonia or with a primary amine of two adjacent units of the formula (I) in a polymer, forming an imide.

If m=0, the units of the formula (VI) derive from unsubstituted or substituted maleic anhydrides, such as maleic anhydride or aconitic anhydride. These latter compounds can be replaced entirely or to some extent by other unsaturated anhydrides, e.g. itaconic anhydride, which have the same effect. If m=1, they derive via elimination of water from two adjacent units of the formula (I) in a polymer ($R^2$=H), with ring closure.

The units of the formula (VII) derive from glycidyl acrylate or glycidyl methacrylate, and the units of the formula (VIII) derive from vinyloxazoline or iso-propenyloxazoline.

Various embodiments of the copolymer are preferred, and contain the following units:

A. from 14 to 96% by weight, preferably from 20 to 85% by weight, and particularly preferably from 25 to 75% by weight, of units of the formula (I), where $R^2$ is not H;
from 0 to 75% by weight, preferably from 1 to 60% by weight, and particularly preferably from 5 to 40% by weight, of units of the formula (V), where m=1;
from 0 to 15% by weight, preferably from 0 to 10% by weight, and particularly preferably from 0.1 to 7% by weight, of units of the formula (I), where $R^2$=H;
from 0.1 to 30% by weight, preferably from 1 to 20% by weight, and particularly preferably from 2 to 15% by weight, of units of the formula (VI), where m=1.

If units of the formula (V) are present, these copolymers are termed polyacrylimides or polymethacrylimides or sometimes also polyglutarimides. These are products which come from polyalkyl acrylates and, respectively, polyalkyl methacrylates, in which two adjacent carboxylate groups have been reacted to give a cyclic imide. The imide is preferably formed with ammonia or with primary amines, e.g. methylamine, in the presence of water, and the units of the formula (VI) and, where appropriate, units of the formula (I), where $R^2$=H, are produced concomitantly via hydrolysis. The products are known, as also is their preparation (Hans R. Kricheldorf, Handbook of Polymer Synthesis, Part A, Verlag Marcel Dekker Inc. New York-Basel-Hongkong, pp. 223 et seq., H. G. Elias, Makromoleküle [Macromolecules], Hüthig und Wepf Verlag Basel-Heidelberg-New York; U.S. Pat. Nos. 2,146,209; 4,246,374). If water only is used for the reaction, the product is units of the formula (VI) and also, if appropriate, acidic units (I) via hydrolysis, without formation of imide units (V).

B. from 10 to 60% by weight, preferably from 15 to 50% by weight, and particularly preferably from 20 to 40% by weight, of units of the formula (IV);

from 39.9 to 80% by weight, preferably from 44.9 to 75% by weight, and particularly preferably from 49.9 to 70% by weight, of units of the formula (III);

from 0.1 to 30% by weight, preferably from 0.6 to 20% by weight, and particularly preferably from 1 to 15% by weight, of units of the formula (VI), where m=0.

Copolymers of this type are obtainable in a known manner via free-radical-initiated copolymerization of e.g. aliphatically unsaturated aromatics, of unsaturated carboxylic anhydrides, and of acrylonitrile or methacrylonitrile.

C. from 39.9 to 60% by weight, preferably from 49.9 to 99.4% by weight, and particularly preferably from 59.9 to 99% by weight, of units of the formula (I);

from 0 to 60% by weight, preferably from 0.1 to 50% by weight, and particularly preferably from 2 to 40% by weight, of units of the formula (IV);

from 0.1 to 30% by weight, preferably from 0.6 to 20% by weight, and particularly preferably from 1 to 15% by weight, of units of the formula (VI), where m=0.

Copolymers of this type are obtainable in a known manner via free-radical-initiated copolymerization of acrylic acid, methacrylic acid, and/or esters thereof, and, if appropriate, of aliphatically unsaturated aromatics or of olefins, and also of unsaturated carboxylic anhydrides.

D. from 25 to 99.8% by weight, preferably from 40 to 98.4% by weight, and particularly preferably from 50 to 97% by weight, of units of the formula (I);

from 0.1 to 45% by weight, preferably from 1 to 40% by weight, and particularly preferably from 2 to 35% by weight, of units of the formula (III);

from 0.1 to 30% by weight, preferably from 0.6 to 20% by weight, and particularly preferably from 1 to 15% by weight, of units of the formula (VI), where m=0.

Copolymers of this type are obtainable in a known manner via free-radical-initiated copolymerization of acrylic acid, methacrylic acid, and/or esters thereof, acrylonitrile or methacrylonitrile, and of unsaturated carboxylic anhydrides.

E. Copolymers having from 95 to 99.9% by weight, preferably from 96 to 99.5% by weight and particularly preferably from 97 to 99.2% by weight, of units of the formula (IV), where $R^6$=H, and from 0.1 to 5% by weight, preferably from 0.5 to 4% by weight and particularly preferably from 0.8 to 3% by weight, of units of the formula (VI), where m=0. This involves a polyolefin functionalized with an unsaturated anhydride, e.g. maleic anhydride. Examples are maleic-anhydride-grafted polyethylene or polypropylene, and also maleic-anhydride-grafted ethylene-propylene rubber or ethylene-propylene-diene rubber.

F. from 0 to 99.9% by weight, preferably from 0.1 to 99.4% by weight, and particularly preferably from 2 to 99% by weight, of units selected from the formulae (I), where $R^2$ is not H, and (III), from 0 to 99.9% by weight, preferably from 0.1 to 50% by weight, and particularly preferably from 2 to 40% by weight, of units of the formula (IV), from 0.1 to 30% by weight, preferably from 0.6 to 20% by weight, and particularly preferably from 1 to 15% by weight, of units of the formula (VII).

G. from 0 to 99.9% by weight, preferably from 0.1 to 99.4% by weight, and particularly preferably from 2 to 99% by weight, of units selected from the formulae (I), where $R^2$ is not H, and (III), from 0 to 99.9% by weight, preferably from 0.1 to 50% by weight, and particularly preferably from 2 to 40% by weight, of units of the formula (IV), from 0.1 to 30% by weight, preferably from 0.6 to 20% by weight, and particularly preferably from 1 to 15% by weight, of units of the formula (VIII).

The copolymer can always contain other additional monomer units, such as those which derive from maleic diesters, from fumaric diesters, from itaconic esters, or from vinyl acetate, as long as the desired adhesion-promoting effect is not substantially impaired thereby.

Surprisingly, it has been found that the presence of the copolymer in the moulding composition of the layer according to II. is necessary in order to achieve reproducible, secure adhesion during the subsequent bonding to the substrate. It has been found experimentally that all although a moulding composition composed mainly of PA612 and of a relatively small portion of PA6 gives secure adhesion during coextrusion with a PA6 moulding composition, a film composed of the same moulding composition gives only inadequate adhesion when it is reverse-coated by an injection-moulding method with a PA6 moulding composition. It is believed that the reason for this can be found in inadequate incipient melting of the film during the reverse coating process. The conditions during coextrusion, where melt is laid onto melt, cannot therefore be transferred to reverse coating by an injection-moulding method. The thickness of the film also plays a part in the achievable level of adhesion: in the case of very thin films, i.e. film thicknesses of about 0.1 mm, which comprise no copolymer, the rapid cooling in the boundary layer between film and reverse-coating material leads to poorer adhesion when comparison is made with similar thick films, because of more effective dissipation of heat to the injection mould. EP-A-1 216 825 is relevant prior art for the coextrusion of similar moulding compositions.

The moulding composition of the layer according to II. can comprise the usual auxiliaries and additives, e.g. plasticizers, stabilizers, processing aids, dyes, pigments or the like. The amount of the agents mentioned is to be metered in such a way as to avoid any serious impairment of the desired properties.

The film can comprise, depending on the application, further layers alongside the layers according to I. and II. inventively present, examples being an outer layer or a substrate-side supportive layer composed of a polyamide moulding composition whose polymer constitution is substantially the same as that of the substrate. The expression "substantially the same as" means here that the group from which the polyamide of the supportive layer is selected is the same as that from which the polyamide of the substrate is selected. By way of example, therefore, if the polyamide of the substrate is a PA66 or a PPA, the polyamide of the supportive layer can be a PA6. The same also applies to the polyamide of component II.a)β), if the film comprises no supportive layer.

An additional outer layer is used especially when the layer according to I. is a colour layer, in order to ensure a desired depth effect for the colouring, or when the intention is to ensure increased scratch resistance. The material of the outer layer is not critical. The group from which it is selected is preferably the same as for the polyamide of the layer according to I.; however, as in the prior art, it can be an acrylate polymer, a fluoropolymer, or a mixture thereof, or a clear polyurethane-based lacquer.

A peelable protective film can also be laminated onto the finished multilayer film, and acts as protection during transport or installation, and is peeled after production of the composite part.

In one preferred embodiment, the thickness of the film is from 0.02 to 1.2 mm, particularly preferably from 0.05 to 1 mm, very particularly preferably from 0.08 to 0.8 mm and with particular preference from 0.15 to 0.6 mm. In one preferred embodiment here, the thickness of the layer according to II. is from 0.01 to 0.5 mm, particularly preferably from 0.02 to 0.4 mm, very particularly preferably from 0.04 to 0.3 mm and with particular preference from 0.05 to 0.2 mm. The film is produced by means of known methods, for example by coextrusion or lamination. It can then be subjected, if appropriate, to a forming process.

In one preferred embodiment, component a)α) of the layer according to II. is composed of PA612 and further preference is given to component b) composed of a maleic-anhydride-grafted polyolefin, e.g. ethylene-propylene rubber or ethylene-propylene-diene rubber. This corresponds to the embodiment E given above. The use of these rubbers has the advantage that there is no risk of gelling during compounding of the moulding composition. If, instead of this, copolymers are used which contain a relatively large proportion of anhydride units, care has to be taken that the admixed polyamides contain a sufficiently low proportion of amino end groups to avoid gelling. Preparation of polyamides of this type with low amino end group content via regulation using added mono- or dicarboxylic acid during polycondensation is prior art; that method gives polyamides which have an excess of carboxy end groups over amino end groups.

In order to maximize avoidance of yellowing of the film, it is advisable to select, as polyamide of the layer according to I., a material which has minimum concentration of amino end groups. Polyamides of this type regulated by mono- or dicarboxylic acid are commercially available. This also applies when there is also an additional outer layer adjoining the layer according to I., since firstly thermo-oxidative degradation can occur even before processing is complete, and secondly an outer layer does not provide an adequate barrier to diffusion of oxygen. Even if there is an additional outer layer which comprises polyamide, it is advisable to use a polyamide with minimum concentration of amino end groups. On the other hand, there are applications in which the colour is not critical because, for example, the composite part has been installed out of sight. In this instance, a polyamide having relatively high amino end group concentration can be used in the layer according to I. or in any additional outer layer present. The only decisive factor is that the invention provides a pathway to provision, when required, of films and, respectively, composite parts with an improved colour curve for exposure to oxidative degradation.

The polyamide of the layer according to I., and also, irrespective thereof, the polyamide of any outer layer present can by way of example have at most 50 mmol/kg, at most 45 mmol/kg, at most 40 mmol/kg, at most 35 mmol/kg, at most 30 mmol/kg, at most 25 mmol/kg, at most 20 mmol/kg, at most 15 mmol/kg, at most 10 mmol/kg or at most 5 mmol/kg, of amino end groups. To determine amino end groups, 1 g of polyamide is dissolved at 25° C. in 50 ml of m-cresol; the solution is titrated potentiometrically with perchloric acid.

The statements applicable to the polyamide of component II. a)β) also apply to the polyamide of the substrate.

The moulding composition of the substrate can comprise the usual additives, examples being plasticizers, processing aids, flame retardants, stabilizers, antistatic agents, impact modifiers, fillers, pigments and reinforcing agents. The moulding composition can moreover comprise further thermoplastics as constituents, examples being polyolefins, polyphenylene ether or ABS.

The cohesive bonding of the film to the substrate can by way of example be produced via adhesive bonding, pressing, lamination or extrusion, or by using an injection-moulding method, foaming method, or compression-moulding method for reverse coating. Prior to formation of the bond between film and substrate, the film can be subjected to a mechanical operation or to a forming process, for example via thermoforming or other processes. The surface can by way of example be structured via embossing. Structuring of the surface is also possible upstream within the context of film extrusion, for example via specifically designed rolls. The composite part obtained can then be subjected to a forming process.

The substrate can have any desired thickness. Its thickness is generally in the range from 0.5 to 100 mm, preferably in the range from 0.8 to 80 mm, particularly preferably in the range from 1 to 60 mm, with particular preference in the range from 1.2 to 40 mm and very particularly preferably in the range from 1.4 to 30 mm. Other preferred upper thickness limits are 25 mm, 20 mm, 15 mm, 10 mm, 6 mm, 5 mm and 4 mm.

In one preferred embodiment, the film is used for the production of a component whose location is within the engine compartment of motor vehicles, of aircraft, of rail vehicles or of ships, for example taking the form of an engine cover, battery cover or battery casing or cover and, respectively, casing for electronics components.

The film according to the claims can moreover be used in the form of a film composite for the design or the decoration of surfaces on and in automobiles and utility vehicles, where the film has adhesive bonding to the substrate. The correspondingly designed component can have the shape of a sheet, for example a bodywork part, an example being a roof module, wheel surround, engine cover or door. Other possible embodiments are those in which elongate components having some degree of curvature are produced, examples being cladding, for example the cladding of what are known as A columns on automobiles, or decorative strips and cover strips of any type, for example radio covers. Protective cladding for door sills provides another example. Alongside applications on the exteriors of automobiles, constituents of the interior can also advantageously be decorated via the inventive films, in particular decorative elements, such as strips and panels.

The film can moreover by way of example be used as protective film with respect to soiling, UV radiation, weathering effects, chemicals or abrasion, or as barrier film on vehicles, in households, on the ground, on tunnels, on tenting and on buildings, or as a carrier of decorative effects, for example for topcoats of sports equipment, of boats or of aircraft, or in households or on buildings.

The examples below are intended to illustrate the invention.

The following moulding compositions for the upper layer (layer according to I), and also for the adhesion-promoter layer (layer according to II) were produced by mixing in the melt:

Moulding composition 1: 70 kg of a polyetheresteramide, prepared from 849.7 kg of laurolactam, 27.27 kg of dodecanedioic acid and 121.04 kg of PTHF 1000, 27 kg of PA12 ($\eta_{rel}$=1.9)

5.5 kg of silver colour powder and 3.0 kg of stabilizer masterbatch

Moulding composition 2: 51 kg of polyetheresteramide (as in moulding composition 1)

45.0 kg of PA12 ($\eta_{rel}$=2.1)

3.0 kg of brilliant silver colour masterbatch 1.0 kg of stabilizers

Adhesion promoter 1: 87.2 kg of PA612 ($\eta_{rel}$=2.3)

7.9 kg of EXXELOR® 1803 (an ethylene-propylene copolymer grafted with from 0.5 to 1% by weight of maleic anhydride)

3.0 kg of white colour masterbatch 1.0 kg of stabilizers

Adhesion promoter 2: 65.2 kg of PA612 ($\eta_{rel}$=1.8)

22.0 kg of PA6 (ULTRAMID® B3K; BASF AG)

7.9 kg of EXXELOR® VA 1803

0.9 kg of LOTADER® AX 8900 (random copolymer composed of ethylene, 24% by weight of methyl acrylate and 8% by weight of glycidyl methacrylate; Arkema)

3.0 kg of white colour masterbatch 1.0 kg of stabilizers

Adhesion promoter 3: as adhesion promoter 1, but without (comparison) EXXELOR® VA 1803

The multilayer films composed of these moulding compositions were produced on a Collin plant whose take-off speed was 2.0 m/min. The extruded individual layers were combined and run through a calender. The width of the films was 24 cm; the thickness of the upper layer and of the adhesion-promoter layer was in each case 200 µm.

In all of the instances studied, the layers adhered securely to one another. Separation of the layers was successful only in the case of the moulding composition 1/adhesion promoter 2 combination; in the other instances, no separation was obtained, but instead cohesive failure of the film layers occurred.

Reverse coating by an injection-moulding method took place on an Engel 650/200 machine with mould temperature of 90° C. and melt temperature of 300° C. The format used here for the film inserted was 100 mm×150 mm×from 0.8 to 10 mm. The thickness of the reverse-coated sheet inclusive of film was 2.5 mm. The results are shown in Table 1.

TABLE 1

| | Results | | | | |
|---|---|---|---|---|---|
| | Inventive Example 1 | Inventive Example 2 | Inventive Example 3 | Inventive Example 4 | Comparative Example 1 |
| Layer according to I (upper) | Moulding composition 1 | Moulding composition 2 | Moulding composition 2 | Moulding composition 2 | Moulding composition 2 |
| Layer according to II (lower) | Adhesion promoter 1 | Adhesion promoter 1 | Adhesion promoter 2 | Adhesion promoter 2 | Adhesion promoter 3 |
| Substrate | PA6[a] | PA6[a] | PA6[a] | PA66[b] | PA6[a] |
| Adhesion to substrate | ns[c] | ns[c] | ns[c] | ns[c] | na[d] |

[a] ULTRAMID® B4 (BASF)
[b] DURETHAN® AC 30 (Lanxess)
[c] not separable
[d] no adhesion

The invention claimed is:

1. A film, comprising:
a polyamide layer comprising at least 40% by weight of at least one polyamide selected from the group consisting of PA6, PA66, PA6/66 and a copolyamide, wherein the copolyamide is obtained from PA6, PA66 and PA6/66 and comprises at most 50% of total monomer units replaced by aromatic monomer units;

a second layer formed directly on the polyamide layer, wherein the second layer is obtained from a molding composition consisting of a polyamide composition (a) in an amount of from 50 to 99 parts by weight, a copolymer (b) in an amount of from 1 to 50 parts by weight with respect to a total amount of the polyamide composition (a) and the copolymer (b), and optionally at least one additive selected from the group consisting of a flame retardant, a stabilizer, an antistatic agent, a filler, a dye, and a pigment; and a first layer formed directly on the second layer, wherein the first layer comprises a molding composition which comprises at least 60% by weight of a polyetheresteramide, the monomer units of the polyamide of the polyetheresteramide comprise an average of at least 8 carbon atoms, wherein:

the polyamide composition (a) consists of a polyamide (α) in an amount of from 40 to 100% by weight, and a polyamide (β) in an amount of 0 to 60% with respect to a total amount of the polyamide (α) and the polyamide (β);

the polyamide (α) is PA612;

the polyamide (β) is at least one selected from the group consisting of PA6, PA66, PA6/66, and a copolyamide, wherein the copolyamide is obtained from PA6, PA66 and PA6/66 and comprises at most 50% of total monomer units replaced by aromatic monomer units;

the copolymer (b) comprises a first monomer unit in an amount of from 70 to 99.9% by weight and a second monomer unit in an amount of 0.1 to 30% by weight;

the first monomer unit is a monomer unit of at least one vinyl compound selected from the group consisting of an acrylic acid derivative, a methacrylic acid derivative, an α-olefin and a vinylaromatic compound; and the second monomer unit comprises a functional group selected from the group consisting of a carboxylic anhydride group, an epoxy group, and an oxazoline group.

2. The film according to claim 1, wherein the molding composition of the first layer comprises at least one of a pigment, a dye, and a metal flake.

3. The film according to claim 1, further comprising an outer layer.

4. The film according to claim 1, wherein the copolymer (b) is a polyolefin having an unsaturated anhydride grafted thereon.

5. The film according to claim 4, wherein the polyolefin is an ethylene-propylene rubber or an ethylene-propylene-diene rubber.

6. The film according to claim 1, wherein the copolymer (b) comprises the first monomer unit in an amount of from 85 to 99% by weight and the second monomer units in an amount of 1 to 15% by weight.

7. The film according to claim 1, wherein the first monomer unit of the copolymer (b) is represented by formula (III):

(III)

wherein R¹ is H or CH₃.

8. The film according to claim 1, wherein the second monomer unit of the copolymer (b) is represented by formula (VII):

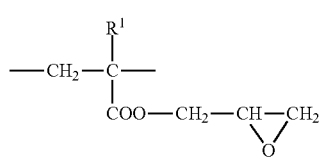

(VII)

wherein R¹ is H or CH₃.

9. The film according to claim 1, wherein the second monomer unit of the copolymer (b) is represented by formula (VIII):

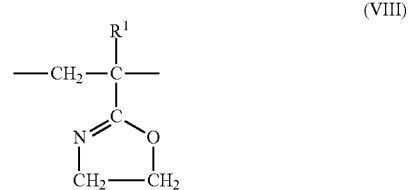

(VIII)

wherein R¹ is H or CH₃.

10. The film according to claim 1, further comprising an outer layer on the first layer, wherein the outer layer comprises at least one of a polyamide, an acrylate polymer, a fluoropolymer or a clear polyurethane-based lacquer.

11. The film according to claim 10, wherein the polymer constitution of the outer layer is the same as the polymer constitution of the first layer.

12. The film according to claim 1, wherein the molding composition consists of the polyamide composition (a) in an amount of from 50 to 99 parts by weight, the copolymer (b) in an amount of from 1 to 50 parts by weight with respect to a total amount of the polyamide composition (a) and the copolymer (b), and optionally at least one additive selected from the group consisting of a stabilizer, a dye and a pigment.

13. A method of preparing the film according to claim 1, the method comprising forming the second layer directly on the polyamide layer and forming the first layer directly on the second layer.

14. A composite part, comprising the film of claim 1 applied to a polyamide substrate.

15. The composite part according to claim 14, wherein the film is applied on the polyamide substrate by adhesive bonding, pressing, lamination or extrusion, or by an injection-molding method, foaming method, or compression-molding method for reverse coating.

16. The composite part according to claim 14, wherein the composite part is an engine cover, a battery cover, a battery casing or a cover or a casing for electronics components.

17. The composite part according to claim 14, wherein:
the polymer constitution of the polyamide (β) is the same as the polymer constitution of the polyamide layer.

18. The composite part according to claim 14, wherein the film is applied directly to the polyamide substrate.

19. A method of preparing the composite part according to claim 14, the method comprising applying the film on the polyamide substrate.

* * * * *